(12) United States Patent
Tadigotla et al.

(10) Patent No.: US 12,078,480 B2
(45) Date of Patent: Sep. 3, 2024

(54) WEAR DETECTION SYSTEMS AND METHODS

(71) Applicant: GOODRICH CORPORATION, Charlotte, NC (US)

(72) Inventors: Venkata Sindhi Tadigotla, Bangalore (IN); Vinayak Vijaya Chandran, Secunderabad (IN)

(73) Assignee: GOODRICH CORPORATION, Charlotte, NC (US)

( * ) Notice: Subject to any disclaimer, the term of this patent is extended or adjusted under 35 U.S.C. 154(b) by 88 days.

(21) Appl. No.: 17/844,378

(22) Filed: Jun. 20, 2022

(65) Prior Publication Data

US 2023/0118122 A1 Apr. 20, 2023

(30) Foreign Application Priority Data

Oct. 18, 2021 (IN) .............................. 202141047245

(51) Int. Cl.
*G01B 7/16* (2006.01)
*F16D 49/00* (2006.01)
*F16D 65/02* (2006.01)
*G01B 13/02* (2006.01)

(52) U.S. Cl.
CPC .............. *G01B 7/16* (2013.01); *G01B 13/02* (2013.01); *F16D 49/00* (2013.01); *F16D 65/028* (2013.01)

(58) Field of Classification Search
CPC G01B 7/16; G01B 13/02; F16D 49/00; F16D 65/028
See application file for complete search history.

(56) References Cited

U.S. PATENT DOCUMENTS

| 7,430,922 B2 | 10/2008 | Herrmann et al. |
| 7,938,157 B2 | 5/2011 | Chen |
| 2018/0141756 A1* | 5/2018 | Hofer ..................... B65G 23/08 |
| 2020/0070906 A1 | 3/2020 | Laperle et al. |
| 2020/0173509 A1* | 6/2020 | Stein ....................... B64C 25/42 |

FOREIGN PATENT DOCUMENTS

| CN | 112129760 | 12/2020 |
| EP | 2872792 | 5/2018 |
| JP | H11216659 | 8/1999 |

\* cited by examiner

*Primary Examiner* — Peter J Macchiarolo
*Assistant Examiner* — John M Royston
(74) *Attorney, Agent, or Firm* — SNELL & WILMER L.L.P.

(57) ABSTRACT

A wear detection device is disclosed herein. The wear detection device may comprise: a housing including a transparent tube, the housing configured to receive a photoconductive fluid; a first casing disposed at a first end of the housing; and a power source disposed in the first casing, the power source configured to power a transmitter in response to the transparent tube being exposed to light. An electrical circuit may be closed in response to an entire length of the transparent tube being exposed to light or only a portion of the transparent tube being exposed to the light.

20 Claims, 8 Drawing Sheets

SECT A-A
FIG. 3

SECT B-B

WEAR DETECTION SYSTEMS AND METHODS

CROSS-REFERENCE TO RELATED APPLICATIONS

This application is a non-provisional of, and claims priority to, and the benefit of India Provisional Application No. 202141047245 with DAS Code 1D4A, entitled "WEAR DETECTION SYSTEMS AND METHODS," filed on Oct. 18, 2021, which is hereby incorporated by reference in its entirety for all purposes.

FIELD

The disclosure relates generally to wear detection systems and methods, and more particularly, to systems, methods, and devices for wear detection of braking rollers in cargo compartments.

BACKGROUND

Rollers, casters, and other wheeled mechanisms are often used to move loads. For heavy loads, the rollers may have an associated braking mechanism to prevent loss of control. In cargo loading systems, for example, braking rollers may have the brake arrangement preset at or near the maximum braking load that is selected for a maximum weight cargo container at the maximum angle of the cargo floor. Braking rollers often have a friction material around the outer surface. Over time, the friction material around the outer surface wears. Thus, inspection of braking rollers may be performed intermittently to ensure the friction material is in an operable condition. Inspections are often manual and time consuming.

SUMMARY

A wear detection device is disclosed herein. The wear detection device may comprise: a housing including a transparent tube, the housing configured to receive a photoconductive fluid; a first casing disposed at a first end of the housing; and a power source disposed in the first casing, the power source configured to power a transmitter in response to the transparent tube being exposed to light.

In various embodiments, the wear detection device may further comprise a first electrode electrically coupled to a positive terminal of the power source and a second electrode electrically coupled to a negative terminal of the power source. The first electrode and the second electrode may extend from the first casing into the transparent tube. The wear detection device may further comprise the photoconductive fluid disposed within the transparent tube. The wear detection device may further comprise a second casing, a first conductive plate coupled to the first casing, and a second conductive plate coupled to the second casing, the second casing disposed at a second end of the housing, a positive terminal of the power source in electrical communication with the first conductive plate, a negative terminal of the power source in electrical communication with the second conductive plate. The wear detection device may further comprise the photoconductive fluid disposed between the first conductive plate and the second conductive plate. In various embodiments, an electrical circuit transitions from an open state to a closed state in response to a length of the transparent tube with the photoconductive fluid disposed therein being exposed to the light.

A brake roller assembly is disclosed herein. The brake roller assembly may comprise: an axle assembly; a brake roller disposed radially outward from the axle assembly, the brake roller configured to rotate about a brake roller axis; a friction sleeve coupled to the brake roller; and a wear detection device disposed radially inward from a radially outer surface of the friction sleeve, the wear detection device configured to transmit a signal in response to an electrical circuit being closed due to the friction sleeve wearing to at least one of a predetermined wear depth and a predetermined wear length.

In various embodiments, the electrical circuit closes due to light interacting with a photoconductive fluid of the wear detection device. The brake roller assembly may further comprise a plurality of the wear detection device spaced apart circumferentially around the brake roller. The wear detection device may be configured to close the electrical circuit in response to the friction sleeve experiencing local wear at a circumferential location of the wear detection device to the predetermined wear depth only. The brake roller assembly may further comprise a second wear detection device spaced apart circumferentially from the first wear detection device, the second wear detection device configured to close a second electrical circuit in response to the friction sleeve experiencing local wear at a second circumferential location of the second wear device to the predetermined wear depth and the predetermined wear length. The brake roller assembly may further comprise a plurality of wear detection devices comprising alternating the first wear detection device and the second wear detection device circumferentially about the brake roller. A photoconductive fluid may be disposed in a transparent tube of the wear detection device. The photoconductive fluid is configured to close the electrical circuit in response to being exposed to light.

A wear detection system for a brake roller assembly is disclosed herein. The wear detection system may comprise: a wear detection device configured to be disposed radially inward from an outer surface of a friction sleeve of the brake roller assembly, the wear detection device including a power source and a transmitter; a receiver in electronic communication with the transmitter; and a controller in electronic communication with the receiver, the controller configured to receive, from the receiver and through a transmitted signal by the transmitter, an indication that the friction sleeve has worn locally to a depth of the wear detection device.

In various embodiments, the transmitted signal is sent in response to the wear detection device being exposed to light. The transmitted signal may be sent in response to a length of the wear detection device associated with a photoconductive fluid being exposed to light. The wear detection system may further comprise a plurality of the wear detection device configured to be spaced apart circumferentially about a brake roller of the brake roller assembly. The controller may be configured to determine, based on receiving multiple transmitted signals from the plurality of the wear detection device, the friction sleeve should be replaced. The controller may be configured to determine whether the friction sleeve is due to be replaced.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Figure 1A:
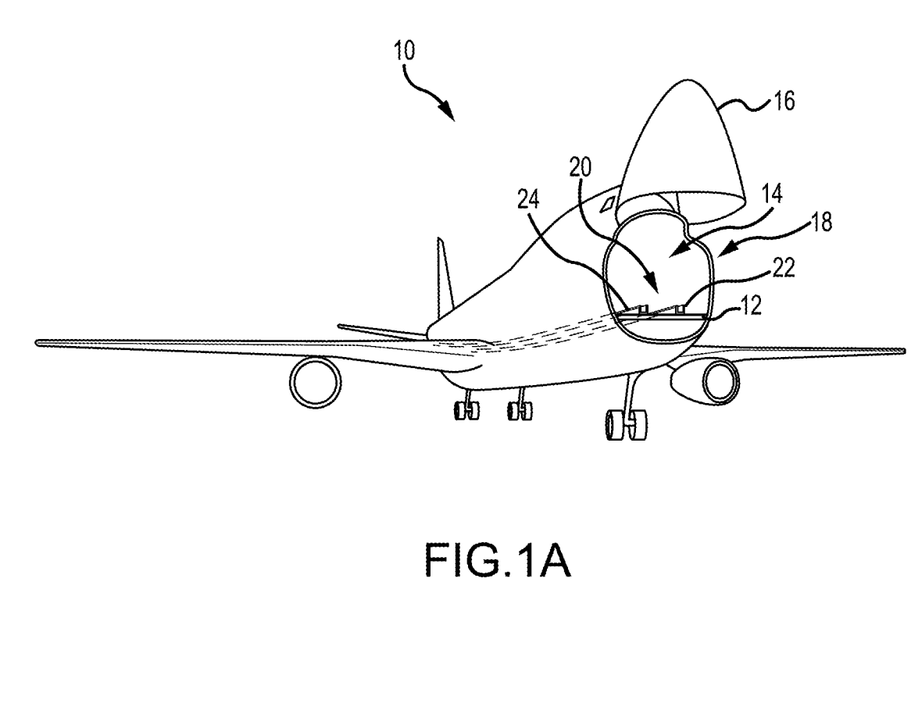
FIGS. 1A and 1B illustrate schematic views of a cargo handling system, in accordance with various embodiments.
Figure 1B:
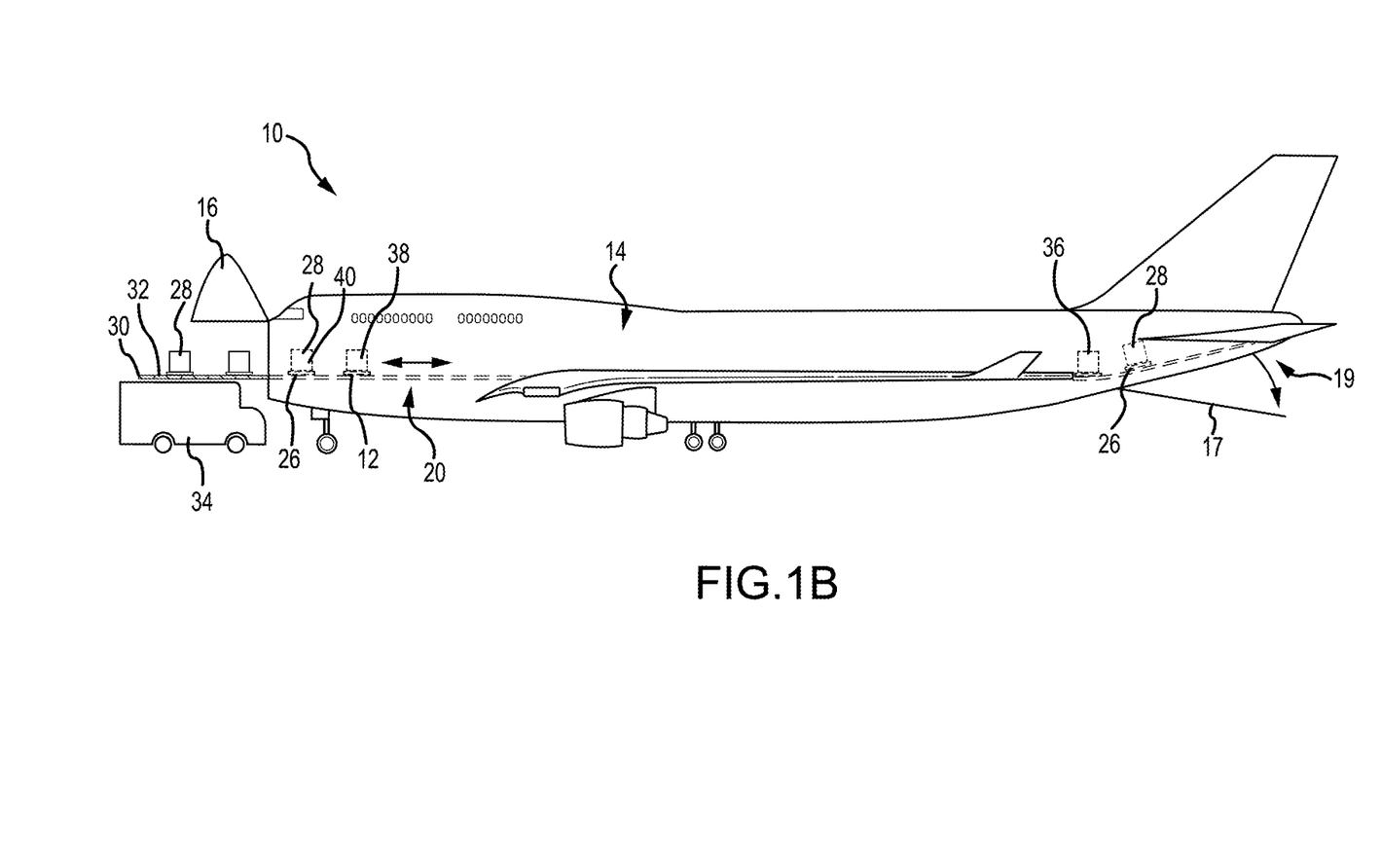

With reference to FIGS. 1A and 1B, a schematic view of an aircraft 10 having a cargo deck 12 located within a cargo compartment 14 is illustrated, in accordance with various embodiments. The aircraft 10 may comprise a cargo load door 16 located, for example, at a forward end of the aircraft 10 and configured to rotate upward (as illustrated in FIG. 1A) or sideways to expose an opening 18 that provides access to the cargo compartment 14. In various embodiments, a second cargo load door 17 may be located at other portions of the aircraft 10, such as, for example, at an aft end of the aircraft 10 and configured to rotate downward (as illustrated in FIG. 1B) and provide a second opening 19 to gain access to the cargo compartment 14. Inside the cargo compartment 14, one or more trays 20, e.g., a first tray 22 and a second tray 24, extend generally from the fore end of the aircraft 10 to the aft end of the aircraft 10. Without loss of generality, a cargo load 28 of any size or shape, which may include objects within containers or unit load devices ("ULDs") or objects not within containers or ULDs, such as, for example, automobiles or the like, will be considered herein as configured for transport on the platform 26.

Still referring to FIGS. 1A and 1B, in various embodiments, the one or more trays 20, during loading or unloading of the cargo load 28, may be connected to a loading structure 30 which, in various embodiments, may comprise one or more trays 32 that correspond to the one or more trays 20 extending along the cargo deck 12 of the aircraft 10. In various embodiments, the loading structure 30 may be attached to an elevated structure, such as, for example, a truck 34 (as illustrated in FIG. 1B) or a scissor lift or a loading dock or the like, such that the one or more trays 20 and the loading structure 30 are located substantially at the same elevation and configured to transition a platform 26 either onto or off from the one or more trays 20. For example, a first cargo load 36 may be transitioned from the loading structure 30, through the opening 18 and onto the one or more trays 20, and then along the one or more trays 20 to the aft end of the aircraft, where the first cargo load is secured for transport. This may be followed by a second cargo load 38, a third cargo load 40 and so on until the cargo deck 12 is filled to a desired capacity with cargo. After the aircraft 10 has reached its destination, each cargo load, such as, for example, the first cargo load 36, the second cargo load 38 and the third cargo load 40 are unloaded from the aircraft 10 in similar fashion, but in a reverse sequence to the loading procedure. To ensure cargo loads are restrained, the aircraft 10 may include a restraint assembly as described herein and in accordance with various embodiments.

Figure 2:
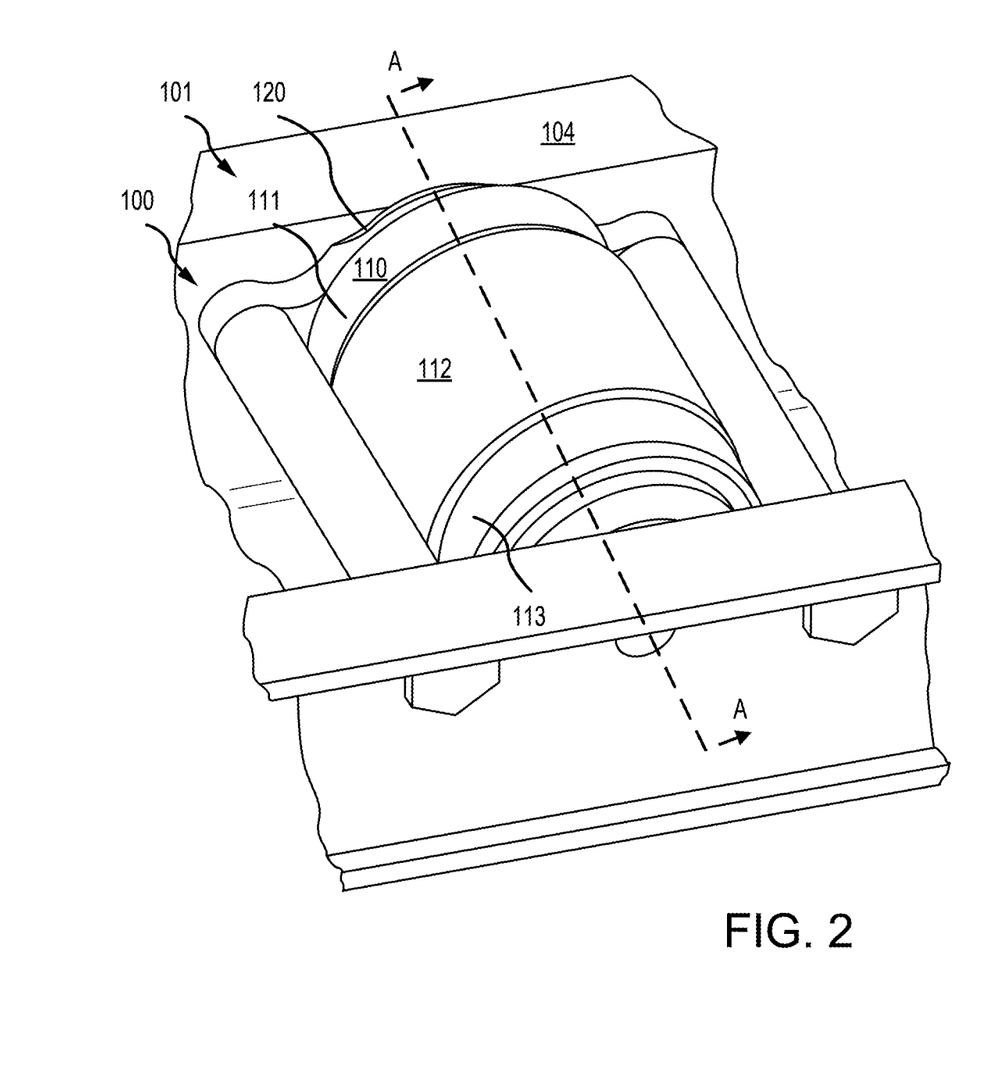
FIG. 2 illustrates a portion of a cargo handling system, in accordance with various embodiments.

Referring now to FIG. 2, a perspective view of a brake roller assembly 100 of a cargo loading system 101 is shown, in accordance with various embodiments. Brake roller assembly 100 may support cargo on tray 104 (e.g., trays 20 from FIG. 1A). Brake roller assembly 100 may include a brake roller 110 and a roller support structure 120. Brake roller 110 may be rotationally coupled to roller support structure 120. The brake roller assembly 100 further comprises a friction sleeve 112. The friction sleeve 112 may be disposed on a radially outer surface of the brake roller 110 axially between a first radial flange 111 and a second radial flange 113. Brake roller 110 may include an internal braking mechanism configured to increase braking force in response to the mass of cargo. The braking force applied by brake roller assembly 100 may have a linear relationship with the mass of the load supported by brake roller assembly 100. In various embodiments, the roller support structure 120 is coupled to the tray 104.

Constant braking may be employed by the brake roller assembly 100 at all loading speeds in both directions. This braking force acts against power drive units ("PDU") designed to move the cargo containers as described previously herein. The braking rollers also necessitate some minimum force to start rolling by overcoming its static friction. When ULDs are not heavy enough, the rollers do not roll and the ULD slides on the friction sleeve 112 of the roller and increases wear of the friction sleeve 112 of the brake roller assembly 100.

Excess wear on the friction sleeve 112 may cause (1) an increase in power consumption of a PDU due to a greater force being necessitated to overcome the minimum force to start rolling; (2) ineffective braking on a ULD due to change in overall friction characteristics; and/or (3) risk system damage due to ineffective braking. Thus, brake roller assembly 100 is monitored and inspected at various points during a life of a brake roller assembly 100. Typical monitoring includes visual inspection, which can be time consuming due to a number of brake roller assembly 100 in the cargo loading system 101. Additionally, wear levels may be difficult to detect visually.

Figure 3:
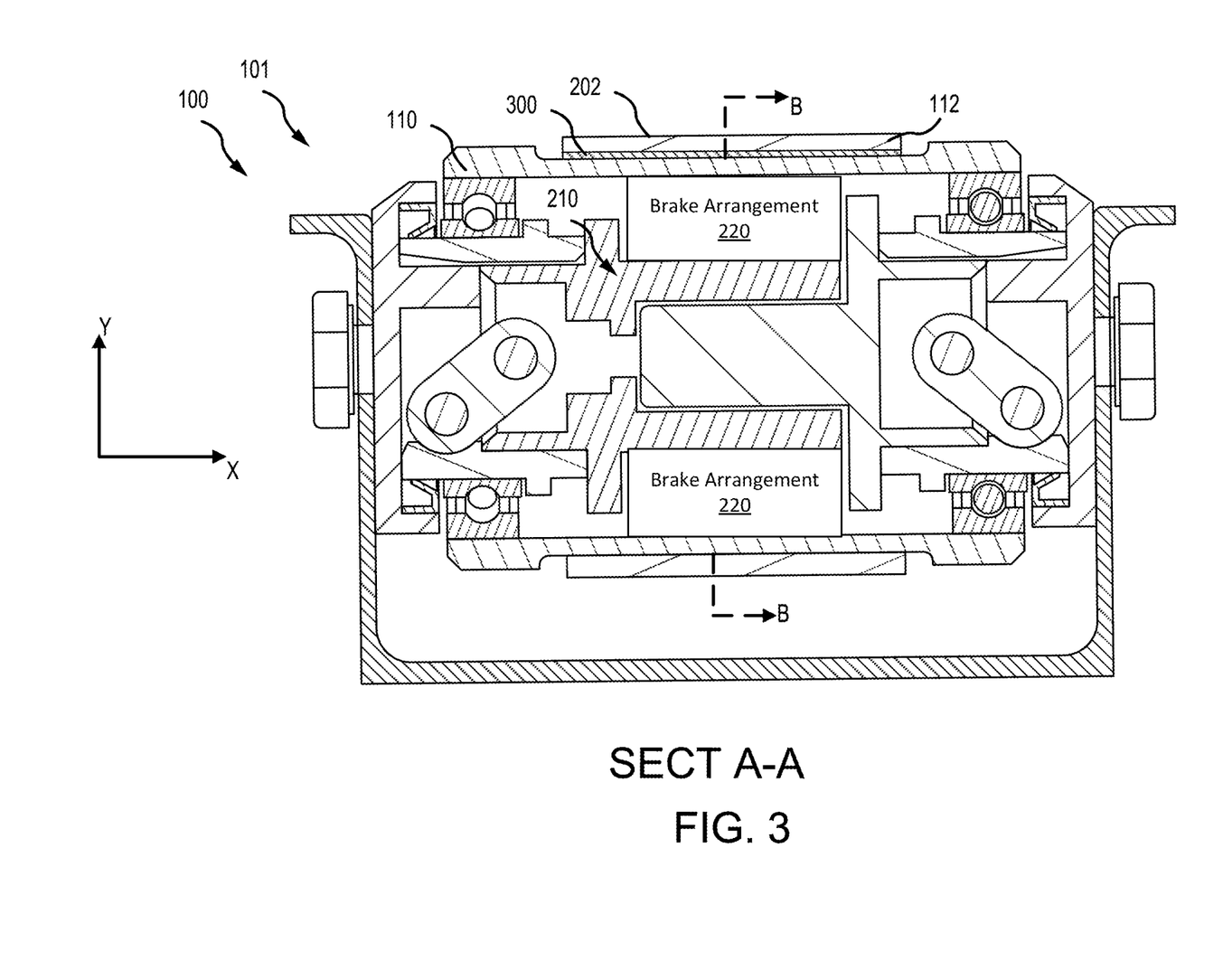
FIG. 3 illustrates a cross-sectional view of a brake roller assembly, in accordance with various embodiments.

Referring now to FIG. 3, a cross-sectional view along section line A-A in FIG. 2 of the brake roller assembly 100 of the cargo loading system 101 is illustrated, in accordance with various embodiments. Brake roller 110 is configured to rotate about axle assembly 210, which extends in the x direction and may serve as both an axis of symmetry and an axis of rotation for brake roller assembly 100.

Axle assembly 210 may act as a spring in the x direction and compress in the x direction in response to a shear load applied to outer surface 202 of the friction sleeve 112 in the y direction. A separate biasing member, such as a torsion spring, a compression spring, a spring washer, or the like can be positioned and configured to urge the axle assembly 210 in the Y-direction opposite to that of the load applied to the outer surface 202. Axle assembly 210 may decompress or expand in the x direction back to its original state in response to the load being removed from outer surface 202

In various embodiments, brake arrangement 220 is disposed radially between the axle assembly 210 and the brake roller 110. Brake arrangement 220 may resist rotation of brake roller 110 in response to a load applied at outer surface 202. Brake arrangement 220 may provide an expanding force for the spring-like behavior of axle assembly 210 by pushing outward in the x direction.

In various embodiments, the brake roller assembly 100 further comprises a wear detection device 300. In various embodiments, the wear detection device 300 is embedded at a predetermined depth of the friction sleeve 112. In various embodiments, the wear detection device 300 extends from an entire axial length of the friction sleeve 112. In various embodiments, the wear detection device 300 extends a predetermined length of the friction sleeve 112. The present disclosure is not limited in this regard. The wear detection devices disclosed herein may be utilized in various configurations within a brake roller assembly 100 and still be within the scope of this disclosure.

In various embodiments, the wear detection device 300 is configured to send a signal (e.g., via a transmitter or a transceiver as described further herein) to a control system display or the like in response to a local amount of wear reaching a predetermined depth on the friction sleeve 112 as described further herein. In various embodiments, the wear detection device 300 is configured to send a signal (e.g., via a transmitter or a transceiver) to a control system display panel or the like in response to an area of wear exceeding a predetermined depth and a predetermined length as described further herein.

Figures 4A, 4B:
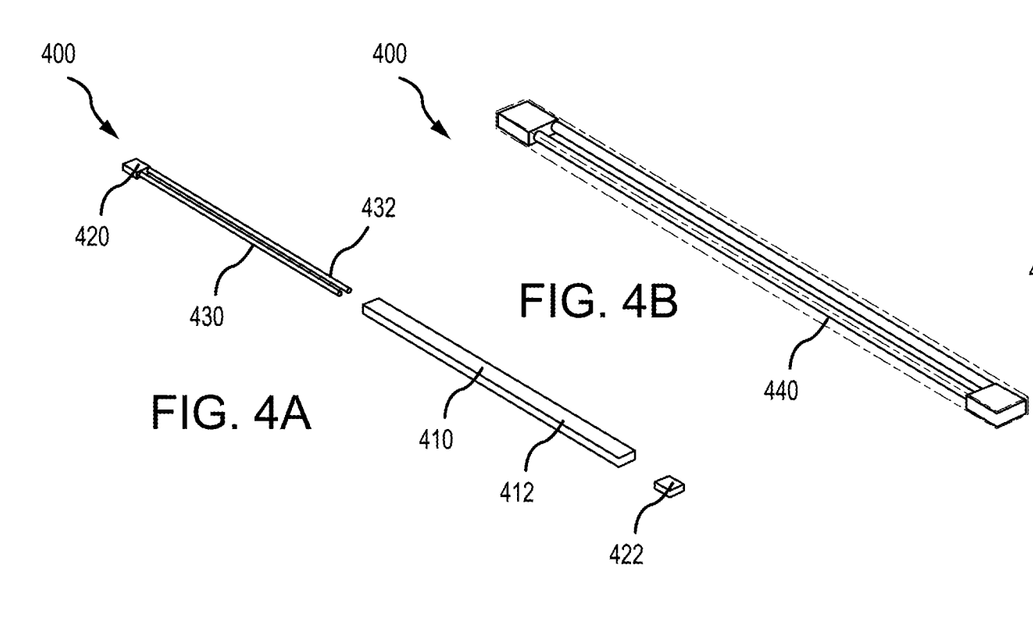
FIG. 4A illustrates an exploded view of a wear detection device, in accordance with various embodiments.
FIG. 4B illustrates a transparent perspective view of a wear detection device, in accordance with various embodiments.
Figure 4C:
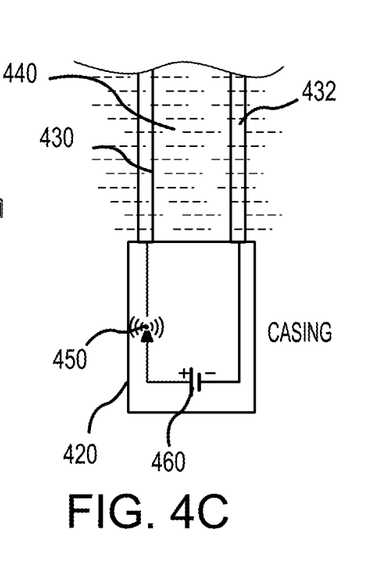
FIG. 4C illustrates a schematic view of a wear detection device, in accordance with various embodiments.

Referring now to FIGS. 4A, 4B, and 4C an exploded view (FIG. 4A), a perspective view (FIG. 4B), and a schematic view (FIG. 4C) of a wear detection device 400 is illustrated, in accordance with various embodiments. The wear detection device comprises a housing 410, a first casing 420, a second casing 422, a first electrode 430, and a second electrode 432. The first casing 420 may have a dual purpose. For example, the first casing 420 may house electrical components of the wear detection device 400 (e.g., a transmitter 450 (or a transceiver) and a power source 460 from FIG. 4C) and the first casing 420 may be configured to seal the housing 410 at a first axial end of the housing 410. In contrast, the second casing 422 may be configured only to seal a second axial end of the housing 410, in accordance with various embodiments. In various embodiments, the second end of the housing 410 may be closed and a second casing 422 may be eliminated. The present disclosure is not limited in this regard.

In various embodiments, the power source 460 may comprise a battery, a capacitor, or any energy storage device for powering transmitter 450. The present disclosure is not limited in this regard.

In various embodiments, the housing 410 may comprise a transparent tube 412. The transparent tube 412 may be made of a similar material to a friction sleeve 112 from FIGS. 2 and 3. In this regard, the wear detection device 300 may maintain a structural stability of the friction sleeve 112 from FIGS. 2 and 3 after installation. In various embodiments, in an assembled state (e.g., FIG. 4B), the wear detection device 400 comprises a photoconductive fluid 440 disposed within the housing 410. In various embodiments, the photoconductive fluid 440 is configured to electrically couple the first electrode 430 to the second electrode 432 in response to light being emitted into the housing 410. In this regard, a circuit defined by the power source 460, the first electrode 430 that is in electrical communication with a positive terminal of the power source 460, and the second electrode 432 that is in electrical communication with a negative terminal of the power source 460 transitions from an open state (i.e., with no current flowing) to a closed state (i.e., with current flowing) in response to light being emitted into the housing. Thus, if the friction sleeve 112 from FIGS. 2 and 3 has local wear that extends to a depth of the housing 410, the housing 410 is exposed to light, and in response to the light a power circuit closes resulting in power being supplied to the transmitter 450 via the power source and a signal being transmitted, from the transmitter 450, to a control system panel display as described further herein.

In various embodiments, the photoconductive fluid 440 comprises a photoconductive polymer, such as poly(N-vinylcarbazole) ("PNVC"), poly(p-phenylene terephthalate carbazole), or any other photoconductive polymer known in the art. In various embodiments, the photoconductive polymer comprises an n-type or p-type photoconductive polymer, though the present disclosure is not limited in this regard.

In various embodiments, the wear detection device 400 may only provide depth information to the control system. For example, if any location along the length of the housing 410 becomes exposed to light, the circuit is closed. Thus, an axial location wear that triggered closing of the circuit may not be determined from the wear detection device 400.

Figure 5A:
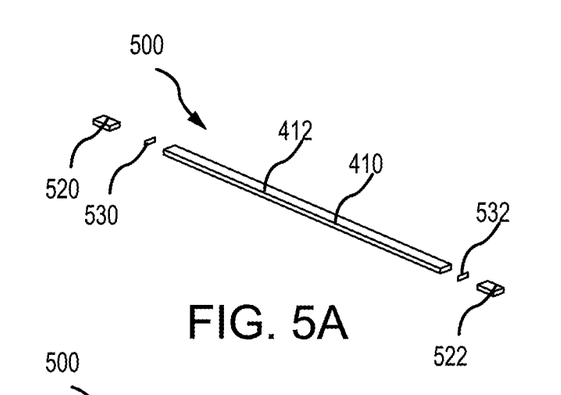
FIG. 5A illustrates an exploded view of a wear detection device, in accordance with various embodiments.
Figure 5B:
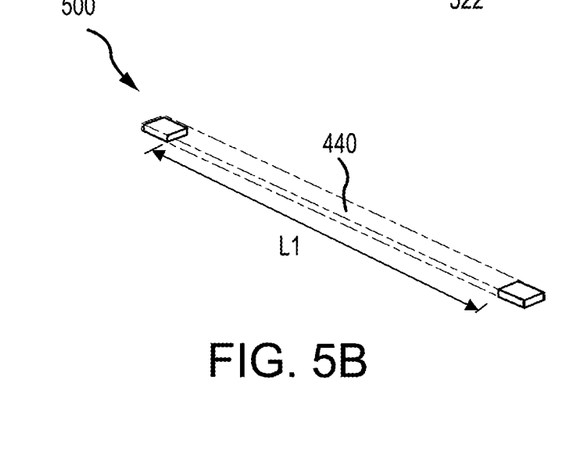
FIG. 5B illustrates a transparent perspective view of a wear detection device, in accordance with various embodiments.
Figure 5C:
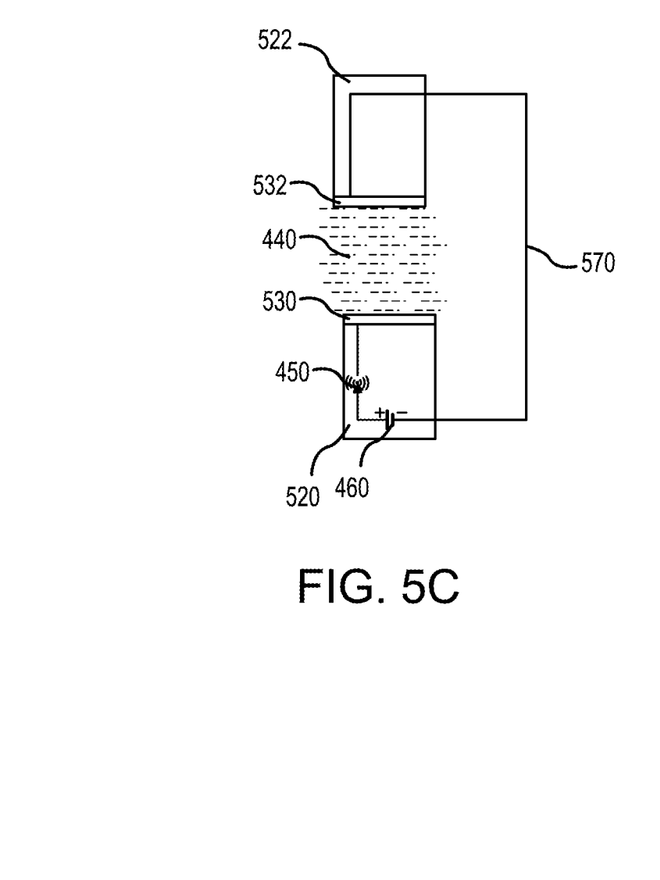
FIG. 5C illustrates a schematic view of a wear detection device, in accordance with various embodiments.

In contrast, with reference now to FIGS. 5A, 5B, 5C, a wear detection device 500 configured to detect wear length and depth is illustrated in an exploded view (FIG. 5A), a perspective view (FIG. 5B), and a schematic view (FIG. 5C), in accordance with various embodiments. The wear detection device 500 comprises a housing 410, a first casing 520, a second casing 522, a first conductive plate 530, a second conductive plate 532, a photoconductive fluid 440, a transmitter 450 (or transceiver), and a power source 460.

The first conductive plate 530 is coupled to the first casing 520 and the second conductive plate 532 is coupled to the second casing 522. Disposed between the first conductive plate 530 and the second conductive plate 532 is the photoconductive fluid 440 disposed in the transparent tube 412 of the housing 410.

In various embodiments, a negative terminal of the power source 460 is electrically coupled to the second conductive plate 532 and a positive terminal of the power source 460 is electrically coupled to the first conductive plate 530 (e.g., via an electrical wire 570). In response to an entire length L1 of the transparent tube 412 being exposed to light, the first conductive plate 530 may be electrically coupled to the second conductive plate 532 through the photoconductive fluid 440. Thus, the electrical circuit transitions from an open state to a closed state in response to the entire length L1 of the transparent tube 412 being exposed to light. If the friction sleeve 112 from FIGS. 2 and 3 has local wear that extends to a depth of the housing 410 across the entire length L1 of the housing 410, the entire housing 410 is exposed to light, and in response to the light a power circuit closes resulting in power being supplied to the transmitter 450 via the power source 460 and a signal is transmitted, from the transmitter 450, to a control system panel display as described further herein.

The wear detection device 500 may be sized and configured to a predetermined length and depth to indicate replacement of the friction sleeve 112. In this regard, the housing 410 of the wear detection device 500 may have a length L1 corresponding to a maximum wear length and the wear detection device 500 may be disposed at a depth corresponding to a maximum wear depth associated with the maximum wear length. Additionally, the wear detection device 500 may be disposed in a location of an axial location of the friction sleeve 112 of FIGS. 2 and 3 associated with a greater amount of wear. For example, the wear detection device 500 may be disposed proximate an axial center location of the friction sleeve 112 of FIGS. 2 and 3, in accordance with various embodiments.

Figure 6:
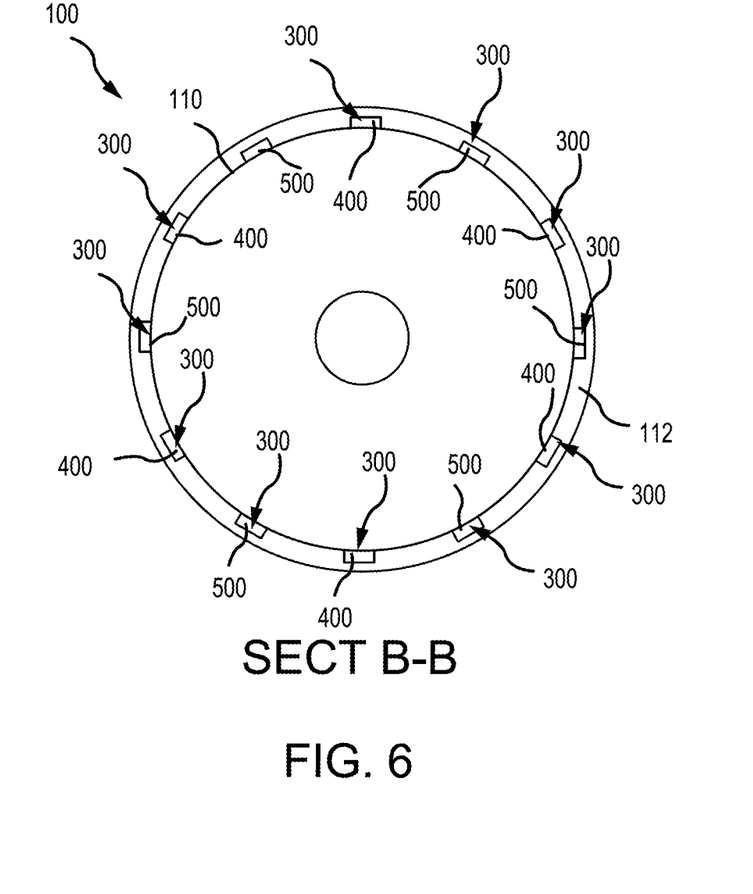
FIG. 6 illustrates a cross-sectional view of a portion of a brake roller assembly, in accordance with various embodiments.

Referring now to FIG. 6, a cross-sectional view along section line B-B from FIG. 3 of a portion of the brake roller assembly 100, in accordance with various embodiments. In various embodiments, the brake roller assembly 100 further comprises a plurality of wear detection devices 300 from FIG. 3. In various embodiments, the plurality of wear detection devices 300 may all be in accordance with wear detection device 400, all be in accordance with wear detection device 500, or include both wear detection devices 400, 500. In various embodiments, the plurality of wear detection devices may include alternating wear detection device 400 and wear detection device 500 spaced apart circumferentially around a radially outer surface of the brake roller 110. In this regard, the wear detection devices 400 may provide an indication to a control system of local wear meeting a depth limit and the wear detection devices 500 may provide an indication of length and depth limits to the control system as described further herein. Thus, in combination, a controller of a control system disclosed herein may determine from the wear detection devices 400, 500 whether a friction sleeve 112 of a brake roller assembly 100 should be replaced, in accordance with various embodiments.

Figure 7:
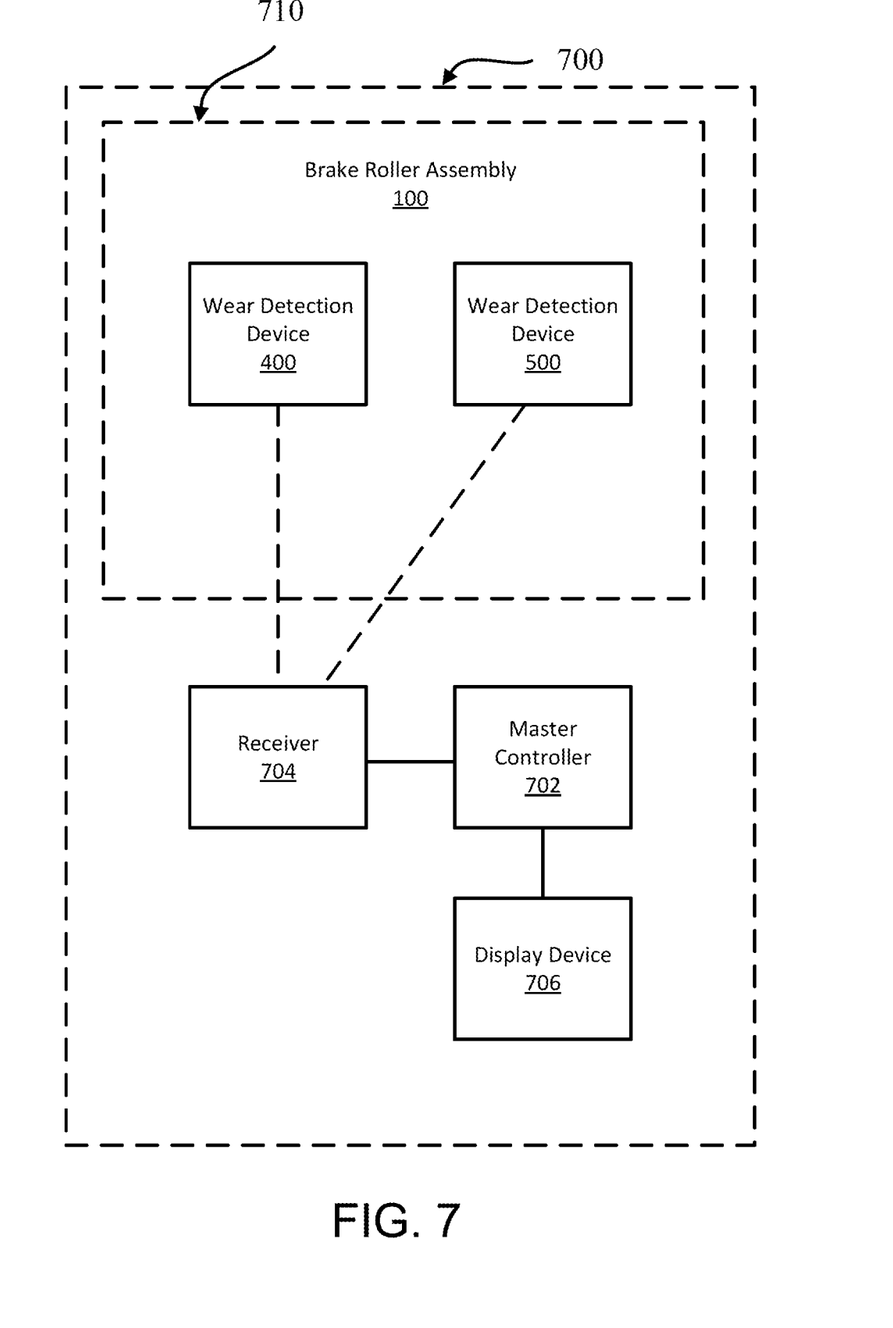
FIG. 7 illustrates a control system for a wear detection system, in accordance with various embodiments.

Referring now to FIG. 7, a schematic view of control system 700 having a wear detection system 710 is illustrated in accordance with various embodiments. In various embodiments, each brake roller assembly 100 in a cargo loading system 101 disclosed previously herein comprises a wear detection system 710. In this regard, as previously described herein, wear for each brake roller in a cargo handling system may be monitored from a single location (e.g., via a display device 706 at a control panel or the like).

In various embodiments, the control system 700 comprises a master controller 702 in operable communication (e.g., wireless or wired) with a receiver 704 (or transceiver) and a display device 706. The receiver 704 is in wireless communication with the brake roller assembly 100. In various embodiments, master controller 702 may be configured as a central network element or hub to access various systems and components of control system 700. Master controller 702 may comprise a network, computer-based system, and/or software components configured to provide an access point to various systems and components of control system 700. In various embodiments, master controller 702 may comprise a processor. In various embodiments, master controller 702 may be implemented in a single processor. In various embodiments, master controller 702 may be implemented as and may include one or more processors and/or one or more tangible, non-transitory memories and be capable of implementing logic. Each processor can be a general purpose processor, a digital signal processor ("DSP"), an application specific integrated circuit ("ASIC"), a field programmable gate array ("FPGA") or other programmable logic device, discrete gate or transistor logic, discrete hardware components, or any combination thereof. Master controller 702 may comprise a processor configured to implement various logical operations in response to execution of instructions, for example, instructions stored on a non-transitory, tangible, computer-readable medium configured to communicate with master controller 702.

System program instructions and/or controller instructions may be loaded onto a non-transitory, tangible computer-readable medium having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

The master controller 702 is in operable communication with the receiver 704. The receiver 704 is configured to receive a signal transmitted from either wear detection device 400 or wear detection device 500 of a brake roller assembly 100 in response to an electrical circuit being closed as described previously herein. Thus, the receiver is configured to transmit wear data to the master controller 702 based on receiving signals from various wear detection devices 400, 500 of a brake roller assembly 100 as described previously herein. The master controller 702 is configured to determine, based on the wear data, when wear of a respective brake roller 110 has exceeded pre-determined limits. In this regard, in response to master controller 702 determining a respective brake roller assembly 100 has exceeded pre-determined wear limits, the brake roller assembly 100 may send a signal to the display device 706 to indicate which brake roller of the brake roller assembly 100 has exceeded wear limits and should be replaced. In various embodiments, the master controller 702 may further be configured to provide an indication to the display device 706 prior to exceeding pre-determined wear limits at set wear intervals (e.g., when multiple wear detection devices 400 indicate local wear exceeds a pre-determined depth limit but none of wear detection devices 500 indicate a wear length has been exceeded). The present disclosure is not limited in this regard.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. A wear detection device, comprising:
   a housing including a tube, the housing configured to receive a photoconductive fluid;
   a first casing disposed at a first end of the housing; and
   a power source disposed in the first casing, the power source configured to power a transmitter in response to the tube being exposed to light.

2. The wear detection device of claim 1, further comprising a first electrode electrically coupled to a positive terminal of the power source and a second electrode electrically coupled to a negative terminal of the power source.

3. The wear detection device of claim 2, wherein the first electrode and the second electrode extend from the first casing into the tube.

4. The wear detection device of claim 3, further comprising the photoconductive fluid disposed within the tube.

5. The wear detection device of claim 1, further comprising a second casing, a first conductive plate coupled to the first casing, and a second conductive plate coupled to the second casing, the second casing disposed at a second end of the housing, a positive terminal of the power source in electrical communication with the first conductive plate, a negative terminal of the power source in electrical communication with the second conductive plate.

6. The wear detection device of claim 5, further comprising the photoconductive fluid disposed between the first conductive plate and the second conductive plate.

7. The wear detection device of claim 6, wherein an electrical circuit transitions from an open state to a closed state in response to a length of the tube with the photoconductive fluid disposed therein being exposed to the light.

8. A brake roller assembly, comprising:
   an axle assembly;
   a brake roller disposed radially outward from the axle assembly, the brake roller configured to rotate about a brake roller axis;
   a friction sleeve coupled to the brake roller; and
   a wear detection device disposed radially inward from a radially outer surface of the friction sleeve, the wear detection device configured to transmit a signal in response to an electrical circuit being closed due to the friction sleeve wearing to at least one of a predetermined wear depth and a predetermined wear length.

9. The brake roller assembly of claim 8, wherein the electrical circuit closes due to light interacting with a photoconductive fluid of the wear detection device.

10. The brake roller assembly of claim 8, further comprising a plurality of the wear detection device spaced apart circumferentially around the brake roller.

11. The brake roller assembly of claim 8, wherein the wear detection device is configured to close the electrical circuit in response to the friction sleeve experiencing local wear at a circumferential location of the wear detection device to the predetermined wear depth only.

12. The brake roller assembly of claim 11, further comprising a second wear detection device spaced apart circumferentially from the first wear detection device, the second wear detection device configured to close a second electrical circuit in response to the friction sleeve experiencing local wear at a second circumferential location of the second wear device to the predetermined wear depth and the predetermined wear length.

13. The brake roller assembly of claim 12, further comprising a plurality of wear detection devices comprising alternating the first wear detection device and the second wear detection device circumferentially about the brake roller.

14. The brake roller assembly of claim 8, wherein a photoconductive fluid is disposed in a tube of the wear detection device, and wherein the photoconductive fluid is configured to close the electrical circuit in response to being exposed to light.

15. A wear detection system for a brake roller assembly, comprising:
   a wear detection device configured to be disposed radially inward from an outer surface of a friction sleeve of the brake roller assembly, the wear detection device including a power source and a transmitter;
   a receiver in electronic communication with the transmitter; and
   a controller in electronic communication with the receiver, the controller configured to receive, from the receiver and through a transmitted signal by the transmitter, an indication that the friction sleeve has worn locally to a depth of the wear detection device.

16. The wear detection system of claim 15, wherein the transmitted signal is sent in response to the wear detection device being exposed to light.

17. The wear detection system of claim 15, wherein the transmitted signal is sent in response to a length of the wear detection device associated with a photoconductive fluid being exposed to light.

18. The wear detection system of claim 15, further comprising a plurality of the wear detection device configured to be spaced apart circumferentially about a brake roller of the brake roller assembly.

19. The wear detection system of claim 18, wherein the controller is configured to determine, based on receiving multiple transmitted signals from the plurality the wear detection device, the friction sleeve should be replaced.

20. The wear detection system of claim 15, wherein the controller is configured to determine whether the friction sleeve is due to be replaced.

* * * * *